United States Patent
Kumazawa

(10) Patent No.: US 11,777,267 B2
(45) Date of Patent: Oct. 3, 2023

(54) CONNECTOR ASSEMBLY

(71) Applicant: Japan Aviation Electronics Industry, Limited, Tokyo (JP)

(72) Inventor: Kazuya Kumazawa, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 17/569,212

(22) Filed: Jan. 5, 2022

(65) Prior Publication Data

US 2022/0285897 A1 Sep. 8, 2022

(30) Foreign Application Priority Data

Mar. 8, 2021 (JP) .................................. 2021-036479

(51) Int. Cl.
| | |
|---|---|
| *H01R 25/14* | (2006.01) |
| *H01R 13/518* | (2006.01) |
| *H01R 31/06* | (2006.01) |
| *H02G 5/00* | (2006.01) |

(52) U.S. Cl.
CPC ........... *H01R 25/14* (2013.01); *H01R 13/518* (2013.01); *H01R 31/06* (2013.01); *H02G 5/00* (2013.01)

(58) Field of Classification Search
CPC ...... H01R 25/14; H01R 13/518; H01R 31/06; H02G 5/00
See application file for complete search history.

(56) References Cited

U.S. PATENT DOCUMENTS

| | | | |
|---|---|---|---|
| 5,055,059 | A | 10/1991 | Logstrup |
| 2006/0023345 | A1* | 2/2006 | Maule .................. G11B 25/066 360/85 |
| 2008/0003850 | A1 | 1/2008 | Seff et al. |
| 2012/0329344 | A1 | 12/2012 | Jeon et al. |
| 2014/0004727 | A1 | 1/2014 | Jimbo et al. |
| 2018/0304835 | A1 | 10/2018 | Skalski |

FOREIGN PATENT DOCUMENTS

| | | |
|---|---|---|
| JP | 2013008656 | 1/2013 |
| WO | WO-2012/121358 A1 | 9/2012 |

OTHER PUBLICATIONS

Extended European Search Report of corresponding EP Application No. 22151362.5, dated Jul. 20, 2022, 9 pages.

\* cited by examiner

*Primary Examiner* — Briggitte R. Hammond
(74) *Attorney, Agent, or Firm* — Muncy, Geissler, Olds & Lowe, P.C.

(57) ABSTRACT

Provided is a connector assembly capable of suppressing temperature rise in a bus bar during energization. The connector assembly of the present invention includes a connector portion having an insertion port, and a bus bar portion having a bus bar, and the bus bar includes a first connection part, a second connection part extending in an opposite direction from the first connection part along the first direction, and a joint portion joining the first connection part and the second connection part. The width of the joint portion is larger than that of each of the first connection part and the second connection part in a range from one end to another end of the joint portion, and a distance from the one end to the another end of the joint portion is larger than the width of each of the first connection part and the second connection part.

13 Claims, 11 Drawing Sheets

CONNECTOR ASSEMBLY

BACKGROUND OF THE INVENTION

The present invention relates to a connector assembly, particularly to a connector assembly configured such that a bus bar portion having a plurality of bus bars is assembled with a connector portion.

One example of a structure in which devices are electrically connected to each other via a bus bar is a connector assembly including: a bus bar portion having a bus bar; and a connector portion. The bus bar portion and the connector portion of this connector assembly are separately provided, i.e., separated from each other before use, and when used, they are assembled with each other by inserting a connection part provided at an end portion of the bus bar into an insertion port of the connector portion.

One example of the above-described connector assembly is a connector assembly 1 shown in FIG. 22 (see JP 2013-8656 A). The connector assembly 1 shown in JP 2013-8656 A is a connector for a hybrid vehicle and used for electrically connecting two motors M for three-phase alternating current to an inverter. The connector assembly 1 includes two bus bar groups 2, 3, and the bus bar group 2 includes a U-pole bus bar 4, a V-pole bus bar 5 and a W-pole bus bar 6, while the bus bar group 3 includes a U-pole bus bar 7, a V-pole bus bar 8 and a W-pole bus bar 9.

The bus bar of each phase is provided with connection parts separately at opposite ends of the bus bar, one of the connection parts is connected to the inverter, and the other of the connection parts is inserted into an insertion port of a connector portion (not shown) provided on a motor side and is connected to the motor. Consequently, the inverter and the motors are electrically connected to each other via the bus bars.

SUMMARY OF THE INVENTION

In the above-described connector assembly, an amount of heat generated in the bus bar during energization tends to become large because, for example, contact resistance becomes larger as compared to the case where the motors and the inverter are directly coupled to the bus bars. Therefore, a temperature of each bus bar rises, and this temperature rise may affect devices and the like around the bus bars. In addition, as the bus bar becomes shorter, the temperature rise in the bus bar may become remarkable.

The present invention has been made in view of the above circumstances and is aimed at attaining an object described below. An object of the invention is to solve the above problem of the conventional art by providing a connector assembly capable of suppressing temperature rise in a bus bar during energization.

In order to attain the above-described object, the connector assembly of the present invention comprises: a connector portion having an insertion port; and a bus bar portion having a bus bar, wherein the bus bar includes a first connection part extending in a first direction, a second connection part extending in an opposite direction from the first connection part along the first direction, the second connection part being inserted in the insertion port, and a joint portion joining the first connection part and the second connection part, wherein each of the first connection part and the second connection part has a thickness in a second direction intersecting the first direction, wherein each of the first connection part, the second connection part and the joint portion has a width in a third direction intersecting the first direction and the second direction, wherein the width of the joint portion is larger than that of each of the first connection part and the second connection part in a range from one end of the joint portion on a side adjacent to the first connection part to another end of the joint portion on a side adjacent to the second connection part, and wherein a distance from the one end to the another end of the joint portion is larger than the width of each of the first connection part and the second connection part.

In the connector assembly of the present invention configured as above, a surface area of the joint portion in the bus bar is enlarged, whereby an amount of heat dissipated from the joint portion can be increased. Therefore, temperature rise in the bus bar during energization can be suppressed.

DETAILED DESCRIPTION OF THE INVENTION

A connector assembly according to the invention is described below with reference to a specific example shown in the appended drawings.

The embodiments described below are only examples presented for easy understanding of the invention, and the invention is by no means limited thereto. In other words, the invention may be modified or improved from the embodiments described below without departing from the scope and spirit of the invention. The materials, shapes and other factors of components of the connector assembly according to the invention can be arbitrarily determined depending on the application of the invention, the state of the art at the time when the invention is carried out, and other conditions. Needless to say, the invention includes its equivalents.

In the present invention, a first direction, a second direction and a third direction are defined as three directions intersecting each other (precisely, intersecting orthogonally to each other), and in the following description, the first direction is assumed to be a Z direction, the second direction be a Y direction, and the third direction be an X direction. The Z direction is a direction in which a bus bar portion described later is assembled with a connector portion, and corresponds to a vertical direction of the connector assembly as well as a vertical direction of each of the bus bar portion and the connector portion which are the constituent components of the connector assembly. Here, a +Z side (upper side) is a side on which the bus bar portion is situated when viewed from the connector portion in the connector assembly, and a −Z side (lower side) is a side on which the connector portion is situated when viewed from the bus bar portion in the connector assembly.

In this description, meaning of the terms "orthogonal" or "parallel" encompasses an error range generally allowed in the technical field of the invention and includes a case where a shift within a range of less than a few degrees (e.g., 2 to 3 degrees) with respect to an exact orthogonality or parallel is present.

For convenience of description, in the following description, assembling of the bus bar portion with the connector portion is simply called "assembling," and the state where the bus bar portion is assembled with the connector portion is called "assembled state."

<<Configuration Example of Connector Assembly>>

Figure 5:
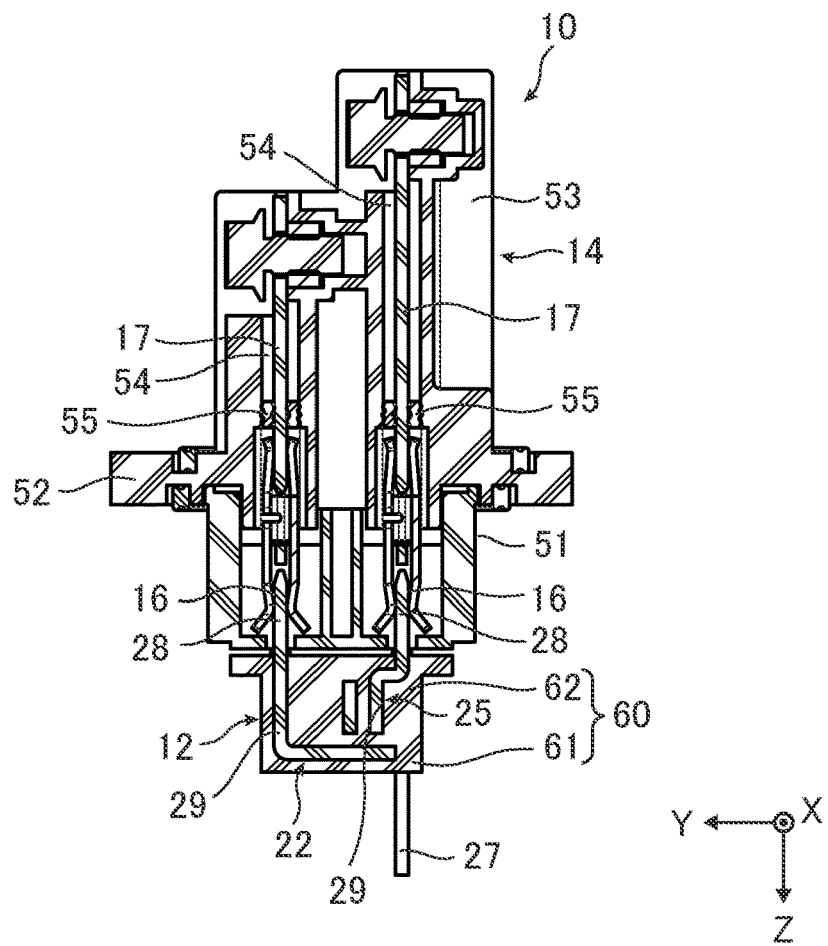
FIG. 5 is a cross-sectional view taken along line A-A shown in FIG. 2.

A configuration example of a connector assembly according to an embodiment of the present invention (hereinafter, referred to as "connector assembly 10") is described with reference to FIGS. 1 to 21. A cross-section shown in FIG. 5 is a cross-section taken along A-A in FIG. 2 and is a cross-section (YZ plane) passing insertion ports described later.

Figure 1:
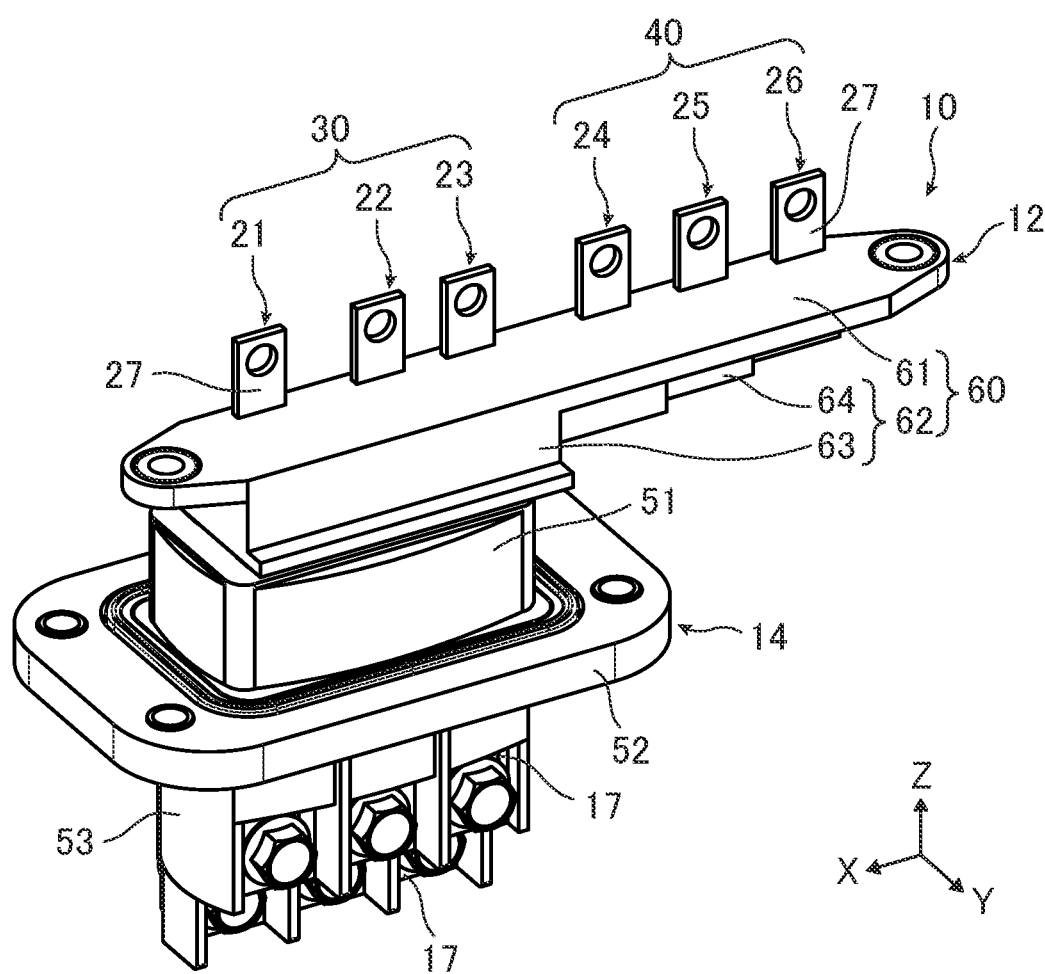
FIG. 1 is a perspective view of a connector assembly according to an embodiment of the present invention.
Figure 2:
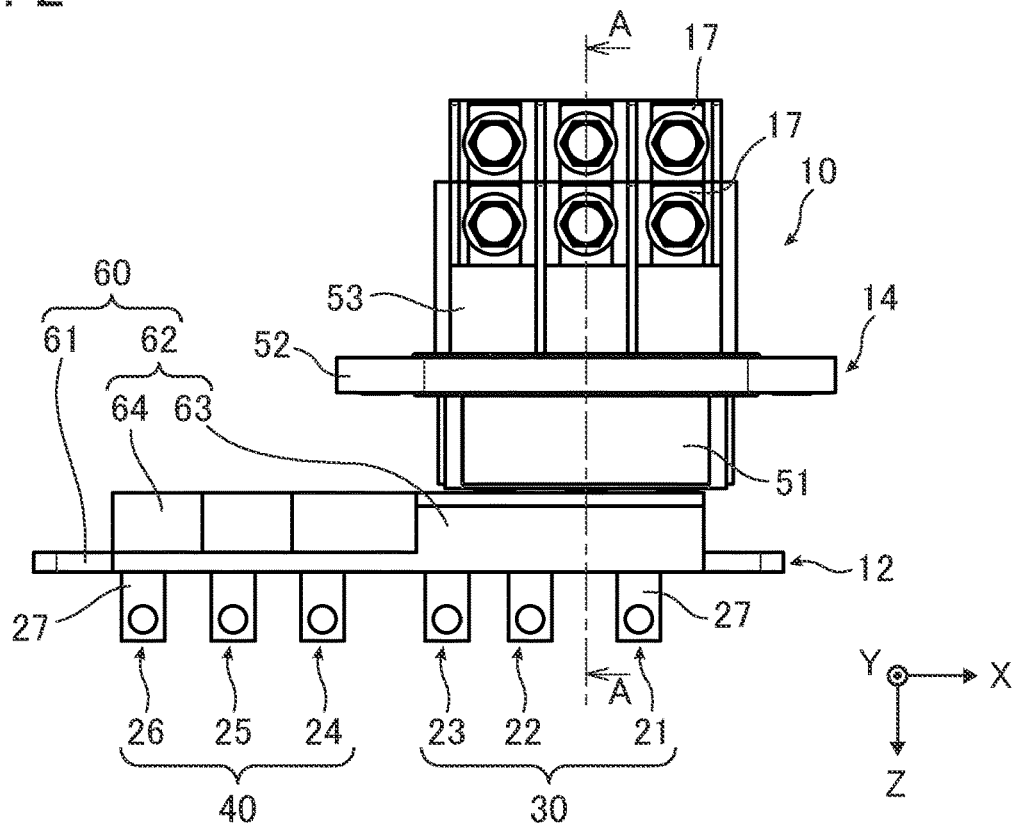
FIG. 2 is a view of the connector assembly according to the embodiment of the present invention when viewed from a +Y side.
Figure 3:
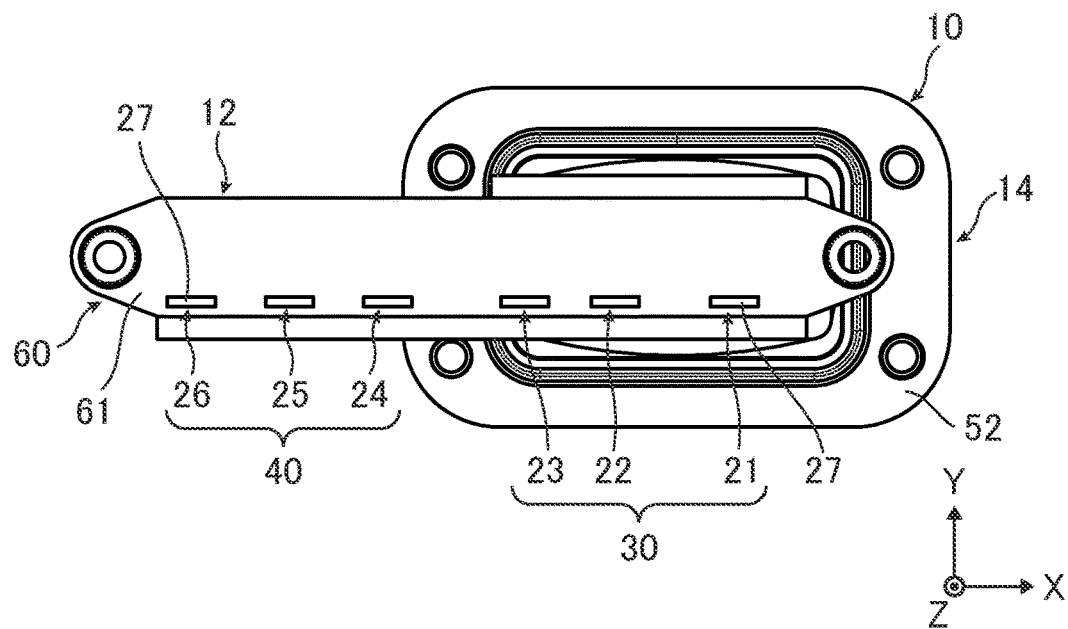
FIG. 3 is a view of the connector assembly according to the embodiment of the present invention when viewed from a +Z side.
Figure 4:
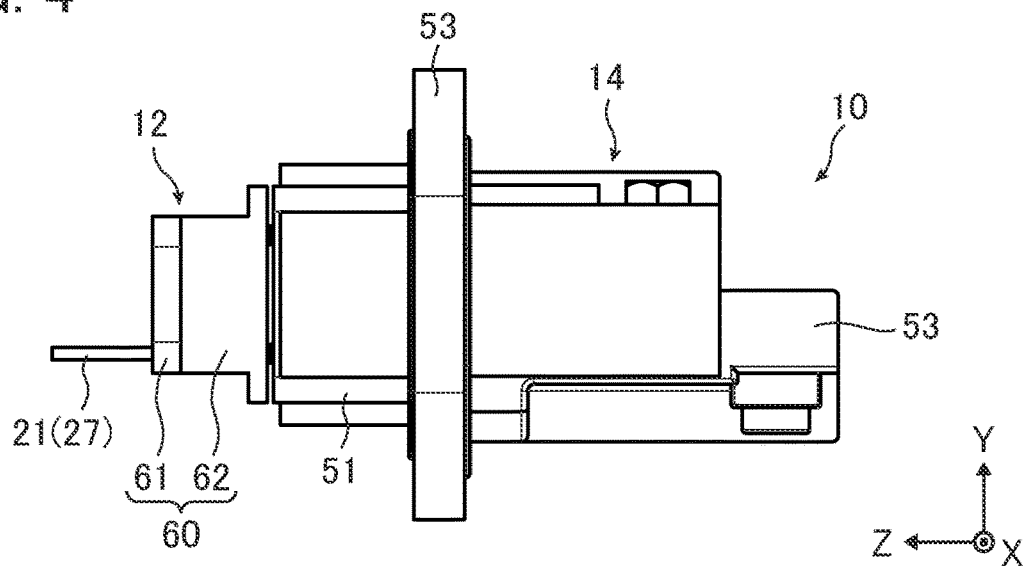
FIG. 4 is a view of the connector assembly according to the embodiment of the present invention when viewed from a +X side.

The connector assembly 10 is used for electrically connecting an on-board motor (not shown) and an inverter (not shown) in, for example, a hybrid vehicle, and has an appearance shown in FIGS. 1 to 4. The on-board motor and the inverter are devices for three-phase alternating current, and as shown in FIGS. 1 and 6 and the like, the connector assembly 10 has bus bars 21, 22, 23, 24, 25, 26 of three phases (U pole, V pole, W pole).

Each bus bar is a conductor for conducting an electric current of a relatively large capacity and is constituted of, for example, a metal plate piece such as copper, brass or aluminum.

Figure 6:
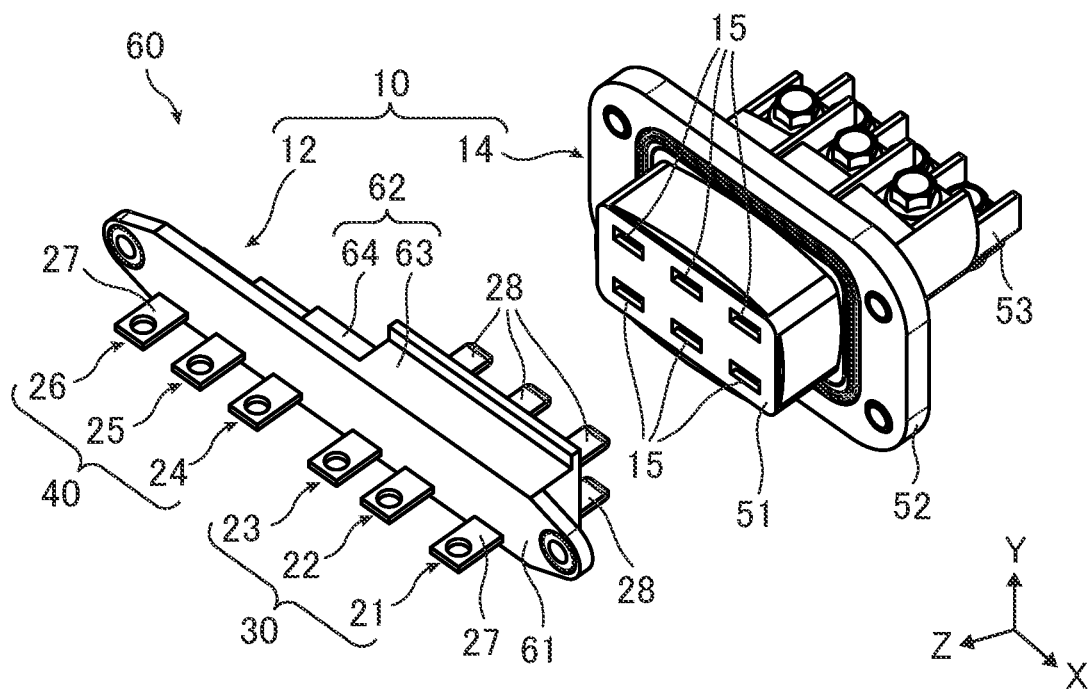
FIG. 6 is a view showing the connector assembly having been separated into a bus bar portion and a connector portion.

The connector assembly 10 according to the invention includes a bus bar portion 12 and a connector portion 14 which can be separated from each other as shown in FIG. 6 for the purpose of improving assemblability. The bus bar portion 12 is connected to the inverter and includes two bus bar units 30, 40 each including three bus bars as shown in FIGS. 1 and 6. Each bus bar unit includes one of the U-pole bus bars 21, 24, one of the V-pole bus bars 22, 25, and one of the W-pole bus bars 23, 26.

Connection parts extending in opposite directions from each other in the Z direction are separately provided on opposite ends of each bus bar. Of these, a connection part extending to the +Z side is a first connection part 27, and a connection part extending to the −Z side is a second connection part 28. The second connection part 28 is connected to a terminal on the connector portion 14 side.

The first connection parts 27 of the bus bars included in each of the two bus bar units 30, 40 are all connected to a common device, for example, electrically connected to the inverter (specifically, a terminal on the inverter). On the other hand, the second connection parts 28 of the bus bars are connected to different devices between the bus bar units, and for example, the second connection parts 28 of the bus bars included in one bus bar unit 30 are electrically connected to a motor for driving a vehicle (specifically, a terminal on the motor). The second connection parts 28 of the bus bars included in the other bus bar unit 40 are electrically connected to a motor for charging (specifically, a terminal on the motor).

The connector portion 14 is fixed on the motor side, and, as shown in FIG. 6, is provided at an end surface thereof on the +Z side with as many insertion ports 15 as the number of the bus bars (i.e., six insertion ports 15). The insertion ports 15 may be regularly arranged, and for example, three insertion ports 15 may be arranged linearly in the X direction to form a line, and a pair of the lines may be disposed with a gap therebetween in the Y direction as shown in FIG. 6. However, the invention is not limited thereto, and the insertion ports 15 may be irregularly arranged.

The bus bar portion 12 is assembled with the connector portion 14 in the Z direction, whereby the connector assembly 10 in the state shown in FIG. 1 is assembled. Specifically, in assembling, the second connection part 28 of each bus bar is inserted into the corresponding insertion port 15. In the assembled state, as shown in FIG. 5, the second connection part 28 of each bus bar is in contact with an intra-connector terminal 16 in an internal space of the connector portion 14. The intra-connector terminal 16 is in contact with a main terminal 17 on an opposite side from a side on which the second connection part 28 is inserted, and the main terminal 17 is electrically connected to the motor.

The connector assembly 10 is assembled in the foregoing manner, whereby the motor and the inverter are electrically connected to each other via the bus bars to establish an electrically conductive state.

(Connector Portion)

A configuration example of the connector portion 14 is described in detail with reference to FIGS. 7 to 10. As shown in FIGS. 7 to 10, the connector portion 14 has, from the +Z side, a connector body 51, a base portion 52, a terminal holding portion 53 and the main terminal 17. The base portion 52 is a plate-like portion whose shape is substantially rectangular when viewed in the Z direction, and serves as a base for fixing the connector portion 14 to a partition wall (not shown) in the vehicle. A fitting hole into which the connector body 51 is fitted is provided at a middle portion of the base portion 52.

Figure 7:
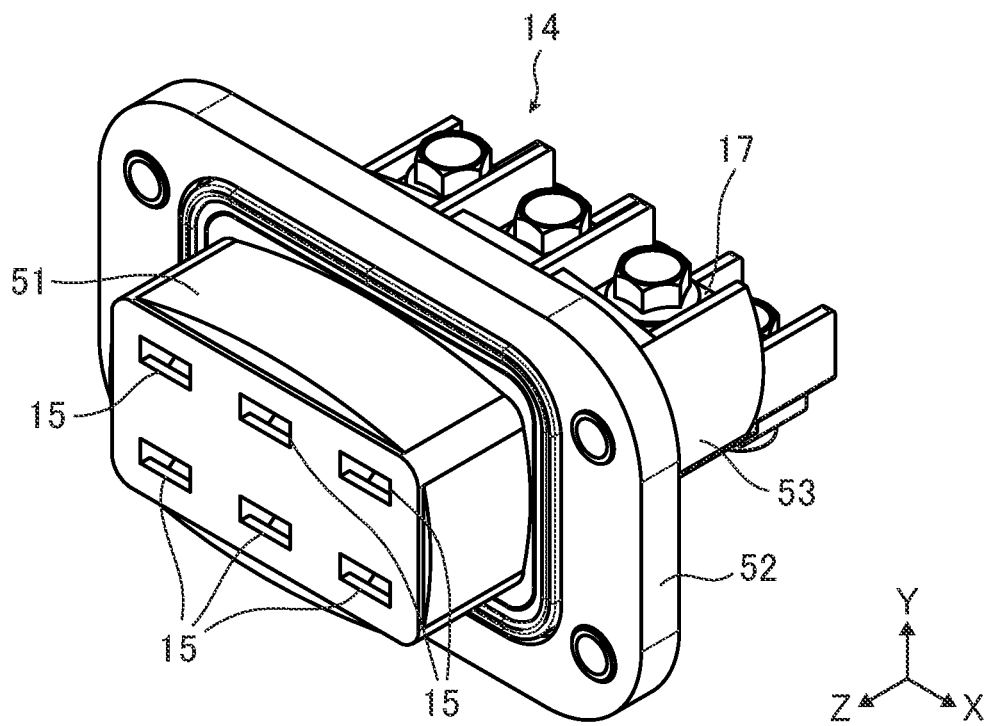
FIG. 7 is a perspective view of the connector portion.
Figure 8:
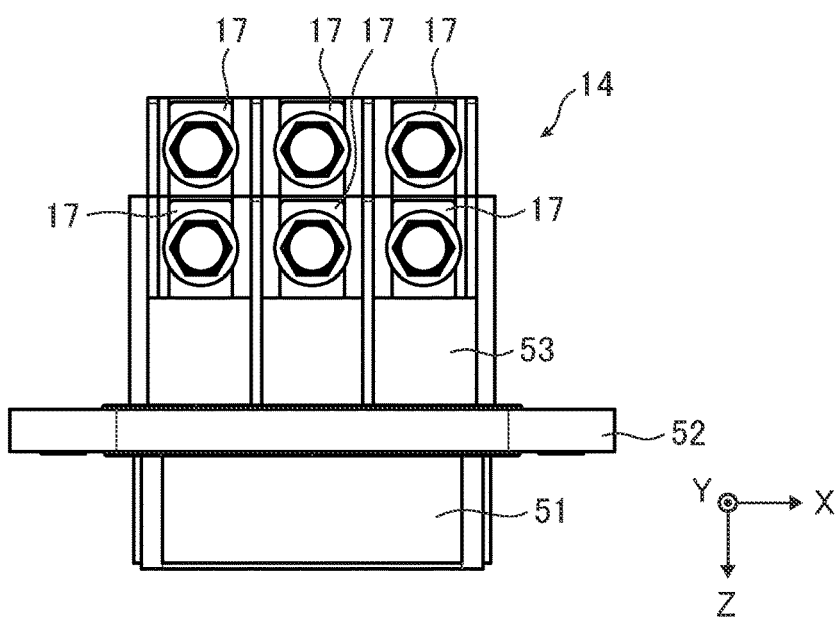
FIG. 8 is a view of the connector portion when viewed from the +Y side.
Figure 9:
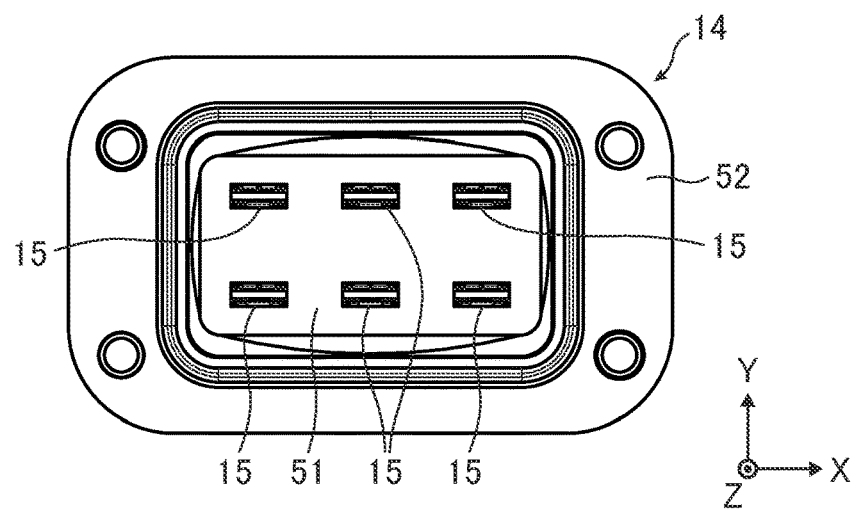
FIG. 9 is a view of the connector portion when viewed from the +Z side.
Figure 10:
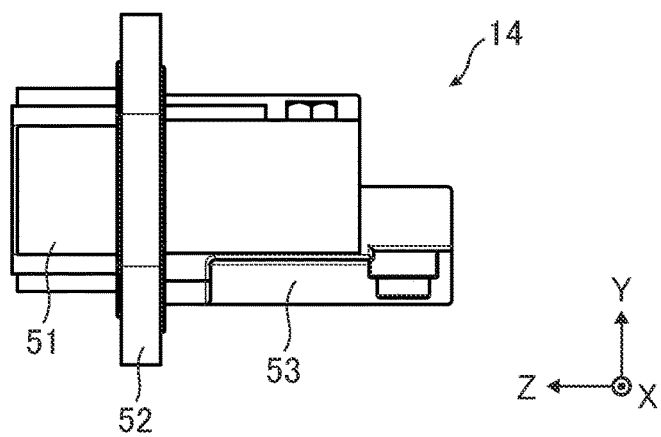
FIG. 10 is a view of the connector portion when viewed from the +X side.

The connector body 51 is a box-like portion projecting from a +Z side end surface of the base portion 52 toward the +Z side, and a +Z side end surface of the connector body 51 is provided with the plurality of insertion ports 15 as shown in FIGS. 7 and 9. The inside of the connector body 51 communicates with each of the insertion ports 15, and as many intra-connector terminals 16 as the number of the insertion ports 15 are accommodated in the connector body 51 (see FIG. 5).

The terminal holding portion 53 is a portion having a step-like shape projecting from a −Z side surface of the base portion 52 toward the −Z side, and as many cavity portions 54 as the number of the insertion ports 15 are formed inside the terminal holding portion 53. As shown in FIG. 5, into each of the cavity portions 54, the corresponding one of the main terminals 17 is inserted, with part of the main terminal 17 passing through the cavity portion 54.

The main terminal 17 is one example of a terminal, and is constituted of, for example, other bus bars different from the bus bars (first bus bars and second bus bars) included in the bus bar portion 12. The number of the main terminals 17 is the same as that of the insertion ports 15, and a −Z side end of each of the main terminals 17 is exposed to the outside from the cavity portion 54, and a motor side terminal (not shown) is bolted to the exposed portion and is in contact with the main terminal 17. In the assembled state, each of the main terminals 17 is electrically connected to the second connection part 28 of the corresponding bus bar via the intra-connector terminal 16. That is, the main terminal 17 together with the bus bar included in the bus bar portion 12 and the intra-connector terminal 16 forms a path of an electric current flowing between the inverter and the motor.

As shown in FIG. 5, the connector portion 14 includes a packing 55 accommodated in the cavity portion 54. The packing 55 is mounted to, of the main terminal 17, a portion which passes through the cavity portion 54 and seals a gap between an inner wall surface of the cavity portion 54 and the main terminal 17. The packing 55 can prevent oil and the like having entered the cavity portion 54 from the motor side from flowing out to the inverter side (i.e., bus bar portion 12 side) through the above-described gap.

(Bus Bar Portion)

A configuration example of the bus bar portion 12 is described in detail with reference to FIGS. 11 to 14. The bus bar portion 12 has a first bus bar unit 30, a second bus bar unit 40, and a holder 60 holding each bus bar constituting these units. A bus bar included in the first bus bar unit 30 is a first bus bar, and a bus bar included in the second bus bar unit 40 is a second bus bar.

The first bus bar unit 30 and the second bus bar unit 40 are each constituted of a plurality of bus bars arranged in the X direction, specifically, three bus bars shown in FIGS. 11 to 14. In the respective bus bar units, the U-pole bus bars 21, 24, the V-pole bus bars 22, 25, and the W-pole bus bars 23, 26 are sequentially arranged from the +X side. The three bus bars 21, 22, 23 constituting the first bus bar unit 30 correspond to a plurality of first bus bars, and the three bus bars 24, 25, 26 constituting the second bus bar unit 40 correspond to a plurality of second bus bars.

Figure 11:
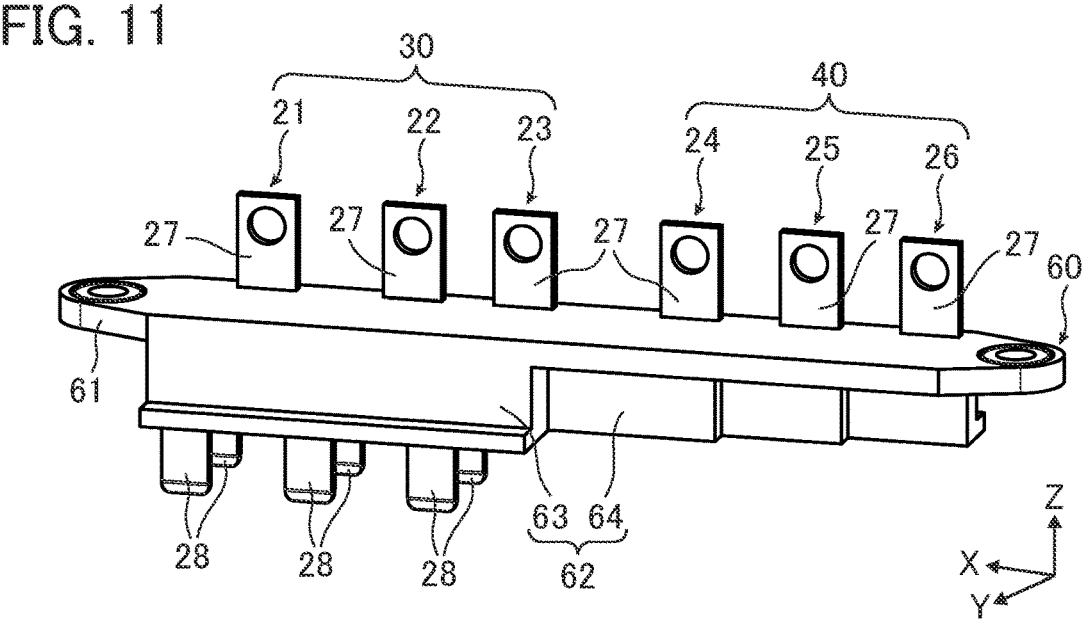
FIG. 11 is a perspective view of the bus bar portion.
Figure 12:
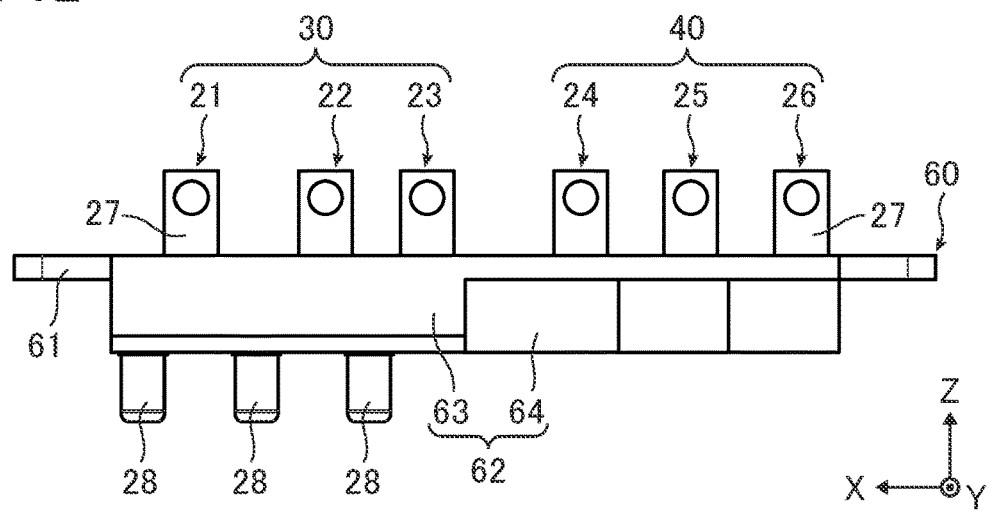
FIG. 12 is a view of the bus bar portion when viewed from the +Y side.
Figure 13:
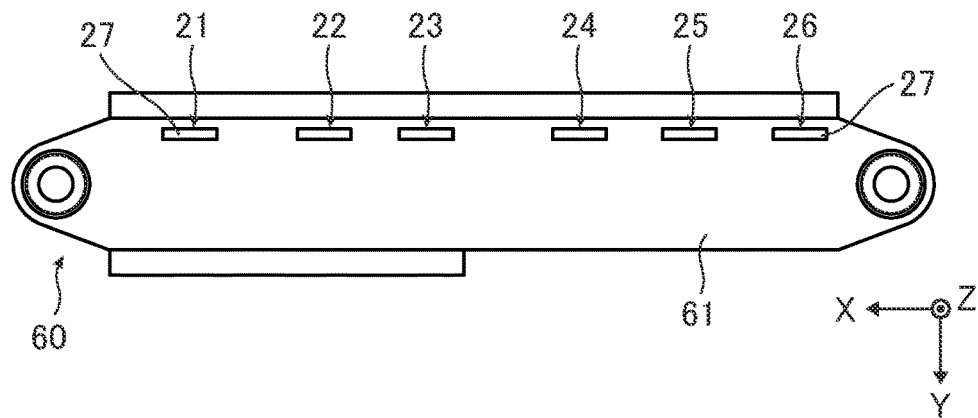
FIG. 13 is a view of the bus bar portion when viewed from the +Z side.
Figure 14:
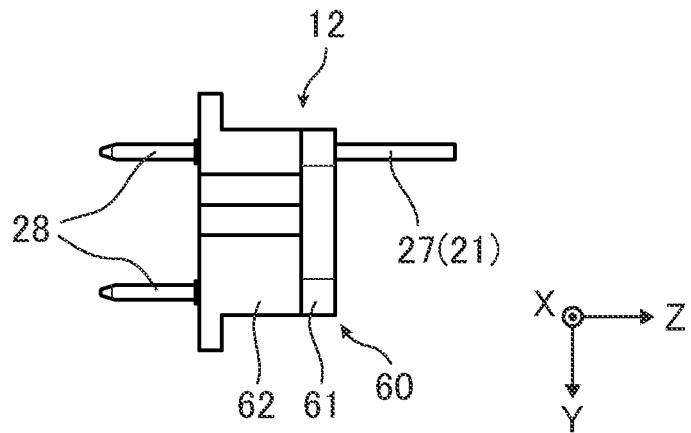
FIG. 14 is a view of the bus bar portion when viewed from the +X side.

The first bus bar unit 30 and the second bus bar unit 40 are separately disposed at positions different from each other in the X direction. Specifically, as shown in FIGS. 11 to 13, the first bus bar unit 30 and the second bus bar unit 40 are disposed on the +X side and the −X side, respectively. In the first bus bar unit 30, the three bus bars 21, 22, 23 are disposed with a gap therebetween, specifically, arranged such that their joint portions 29 described later are disposed to be offset from each other in the X direction (see FIGS. 15 to 17). In the second bus bar unit 40, the three bus bars 24, 25, 26 are disposed to be offset from each other in the X direction and the Y direction. Specifically, the three bus bars 24, 25, 26 are arranged such that their joint portions 29 overlap in the Y direction and the number of the joint portions 29 overlapping each other increases toward the +X side (see FIGS. 15 to 17).

As described above, each bus bar constituting each bus bar unit has the connection parts, specifically, the first connection part 27 and the second connection part 28 separately provided at its opposite ends in the Z direction. As shown in FIGS. 11 and 12, The first connection part 27 and the second connection part 28 extend in opposite directions from each other in the Z direction.

The first connection part 27 is provided on an opposite side from the connector portion 14 (+Z side) in each bus bar, extends toward the +Z side, and has a rectangular shape in a front view (when viewed in the Y direction). As shown in FIGS. 11 to 13, the first connection part 27 of each bus bar included in the first bus bar unit 30 is situated at a position, in the X direction, different from that of the first connection part 27 of each bus bar included in the second bus bar unit 40, and, in the assembled state, is situated on a side closer to the connector portion 14 in the X direction (i.e., +X side).

The second connection part 28 is provided on a side on which the connector portion 14 is situated (−Z side) in each bus bar, extends toward the −Z side, and has a rectangular shape in a front view (when viewed in the Y direction). As shown in FIGS. 11, 12, 15 and 16, in each bus bar, the second connection part 28 is situated at a position, in the X direction, different from that of the first connection part 27 and is offset to the +X side with respect to the first connection part 27. The fact that the first connection part 27 and the second connection part 28 are separately situated at positions different from each other in the X direction means that an offset is present between the center position of the first connection part 27 and the center position of the second connection part 28 in the X direction.

Each bus bar included in the second bus bar unit 40 has a larger offset amount between the first connection part 27 and the second connection part 28 in the X direction than that of each bus bar included in the first bus bar unit 30.

The second connection part 28 of each bus bar included in the first bus bar unit 30 and the second connection part 28 of each bus bar included in the second bus bar unit 40 are both situated on a +X side end of the bus bar portion 12, and specifically, extend from a −Z side end surface of the first holding portion 63 described later. In the configuration shown in FIGS. 11 and 12, in the first bus bar unit 30 and the second bus bar unit 40, the second connection parts 28 of the U-pole bus bars 21, 24 are disposed at substantially the same position in the X direction. Similarly, in the respective bus bar units, the positions of the second connection parts 28 of the V-pole bus bars 22, 25 in the X direction are substantially the same, and the positions of the second connection parts 28 of the W-pole bus bars 23, 26 in the X direction are also substantially the same.

The number of the bus bars constituting each of the first bus bar unit 30 and the second bus bar unit 40 may be determined depending on a specification of an electrical device to be connected to the connector assembly 10, and the number may be three or more or two or less.

Each bus bar has the joint portion 29 between the first connection part 27 and the second connection part 28 (see FIGS. 15 to 21). The joint portion 29 is a portion which joins the first connection part 27 and the second connection part 28, and the configuration of the joint portion 29 is described later in detail.

The holder 60 is a resin molded product having insulating properties. As a resin material constituting the holder 60, a material having excellent heat resistance is preferred, and for example, polyphenylene sulfide (PPS) is available. As shown in FIGS. 11 to 14, the holder 60 has an elongated portion 61 of plate shape and a holding portion 62 projecting from a −Z side surface of the elongated portion 61 toward the −Z side.

The elongated portion 61 is a portion extending in the X direction, and the first connection part 27 of each bus bar passes through the elongated portion 61 in the Z direction. Specifically, as shown in FIGS. 11 to 14, the first connection part 27 of each bus bar of the first bus bar unit 30 projects on the +X side of the elongated portion 61, and the first connection part 27 of each bus bar of the second bus bar unit 40 projects on the −X side of the elongated portion 61. In the configuration shown in FIGS. 11 and 13, the first connection parts 27 of the bus bars 21, 22, 23 included in the first bus bar unit 30 and the first connection parts 27 of the bus bars 24, 25, 26 included in the second bus bar unit 40 are arranged in a straight line in the X direction.

The holding portion 62 is a portion in which the joint portion 29 of each bus bar is embedded, and is divided into a first holding portion 63 and a second holding portion 64 as shown in FIGS. 11 and 12.

The second holding portion 64 is a portion situated on the −X side of the holding portion 62, and the joint portion 29 of each bus bar included in the second bus bar unit 40 is embedded in the second holding portion 64. The second holding portion 64 extends in the X direction as shown in FIGS. 11 and 12, and the thickness thereof varies in three stages in the Y direction and increases toward the +X side. The number of the embedded joint portions 29 changes in a portion whose thickness changes in the second holding portion 64. For example, the joint portion 29 of one bus bar 26 is embedded in a portion whose thickness is the smallest, while the joint portions 29 of the three bus bars 24, 25, 26 are embedded in a portion whose thickness is the largest.

The first holding portion 63 is a portion situated on the +X side of the holding portion 62 and continuous with the second holding portion 64 in the X direction. The joint portion 29 of each bus bar included in the first bus bar unit 30 and the joint portion 29 (precisely, the +X side portion of the joint portion 29) of each bus bar included in the second bus bar unit 40 are embedded in the first holding portion 63.

As shown in FIGS. 11 and 12, the second connection parts 28 of the bus bars included in the bus bar unit 30 and the bus bar unit 40 (i.e., six bus bars) project from a −Z side end surface of the first holding portion 63.

With the above-described holding 60, the three bus bars included in the bus bar unit 30 and the three bus bars included in the second bus bar unit 40 are satisfactorily held while a predetermined space (clearance) is provided between the bus bars. Therefore, the insulating properties between the bus bars are ensured and in particular, more improved when three bus bars are integrally molded with the holder 60.

Figure 19:
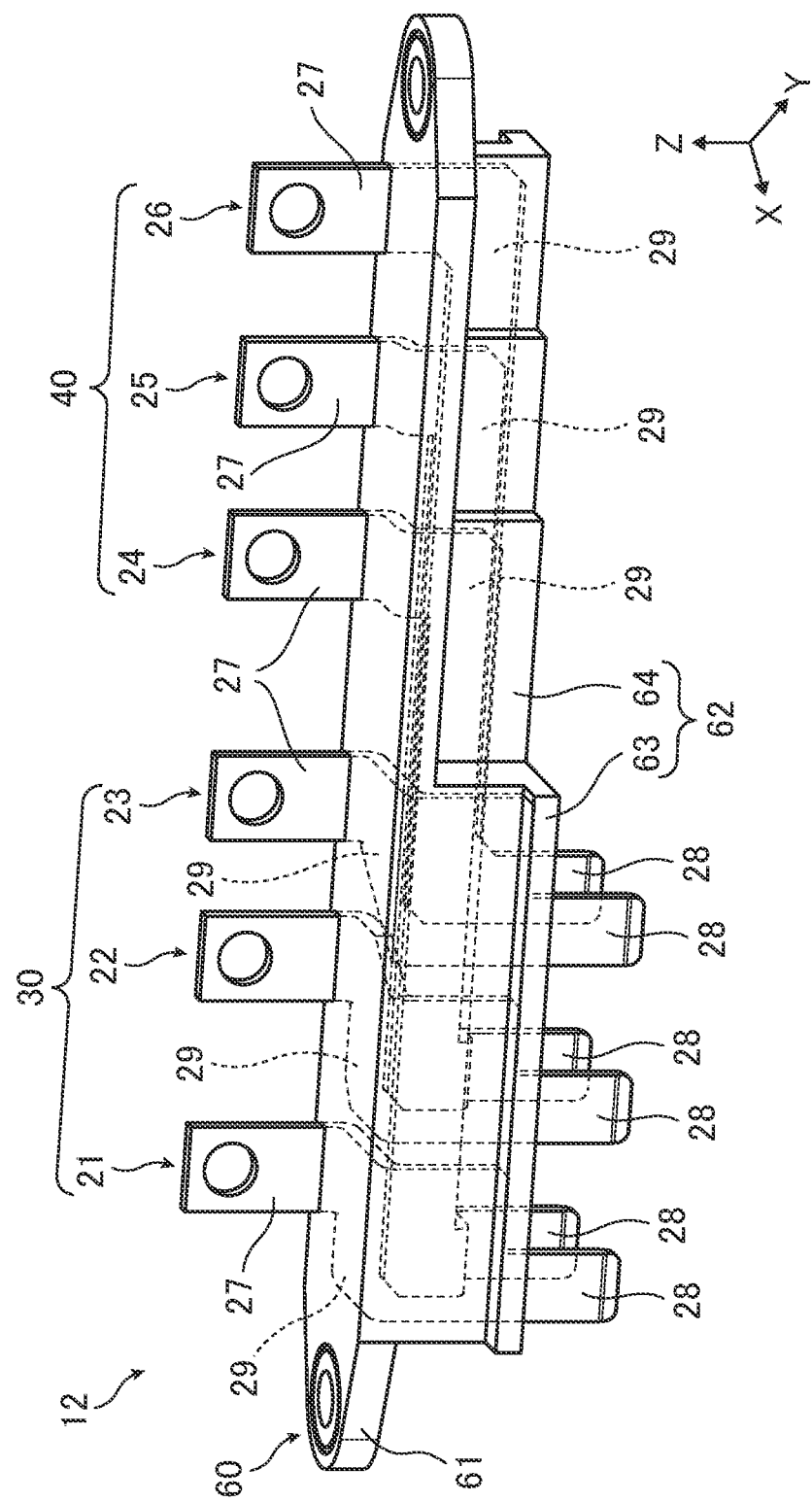
FIG. 19 is a view showing an arrangement position of each bus bar in a resin portion.

To be more specific, the whole of the joint portions 29 of the respective bus bar included in the first bus bar unit 30 and the whole of the joint portions 29 of the respective bus bar included in the second bus bar unit 40 are embedded in the resin material constituting the holder 60 (see FIG. 19). Thus, the insulating resin material constituting the holder 60 enters between the adjacent bus bars (specifically, between the joint portions 29) in the holder 60 to ensure a constant clearance. As a result, short circuit (short) caused by contact between the bus bars can be appropriately avoided.

As a method of manufacturing the holder 60, preferred is a molding method in which a plurality of bus bars are separately set in advance at predetermined positions in an injection space formed by a mold (not shown) and a resin material is then introduced into the injection space, i.e., insert molding (integral molding). However, the invention is not limited thereto, and for example, the holder 60 may be configured by fragmentarily molding the holder 60 to form a plurality of pieces of the holder 60, separately fitting a plurality of bus bars to the plurality of pieces, and combining the plurality of pieces to which the plurality of bus bars are separately fitted.

(Joint Portion of Each Bus Bar)

The joint portion 29 of each bus bar included in the first bus bar unit 30 and the second bus bar unit 40 is described in detail with reference to FIGS. 15 to 21. The joint portion 29 of each bus bar included in the first bus bar unit 30 has a different configuration and a different shape from those of the joint portion 29 of each bus bar included in the second bus bar unit 40.

Figure 15:
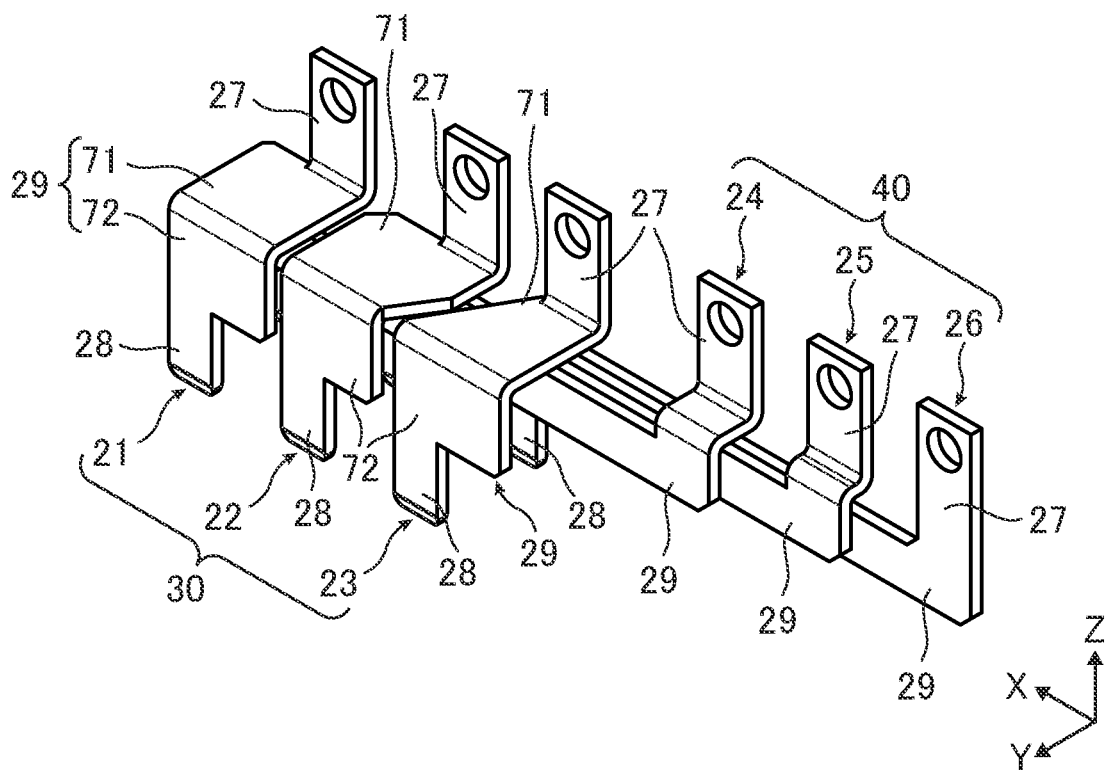
FIG. 15 is a perspective view of a plurality of bus bars provided to the bus bar portion.

As shown in FIG. 15, the joint portion 29 of each bus bar included in the first bus bar unit 30 is bent such that the shape thereof in a side view (when viewed in the X direction) has a substantially L shape. In other words, in the first bus bar unit 30, the joint portion 29 includes an adjacent portion 71 which is adjacent to and intersects the first connection part 27, and an extending portion 72 which is bent from the adjacent portion 71 and extends toward a side on which the second connection part 28 is situated.

Figure 20:
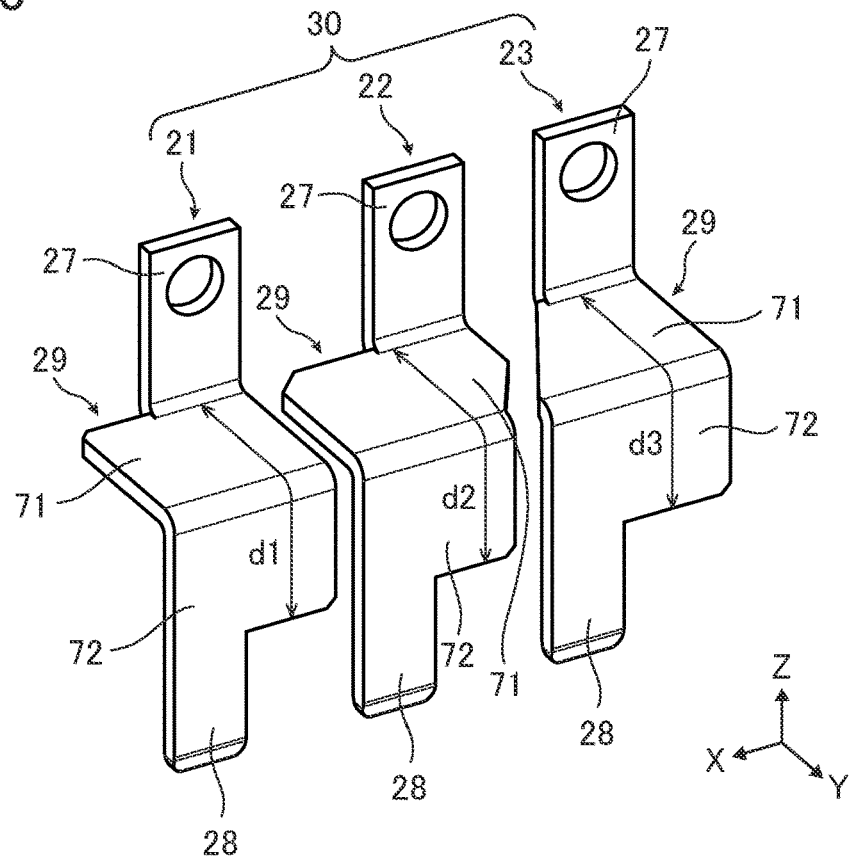
FIG. 20 is a perspective view showing a size of each portion of a first bus bar (part 1).
Figure 21:
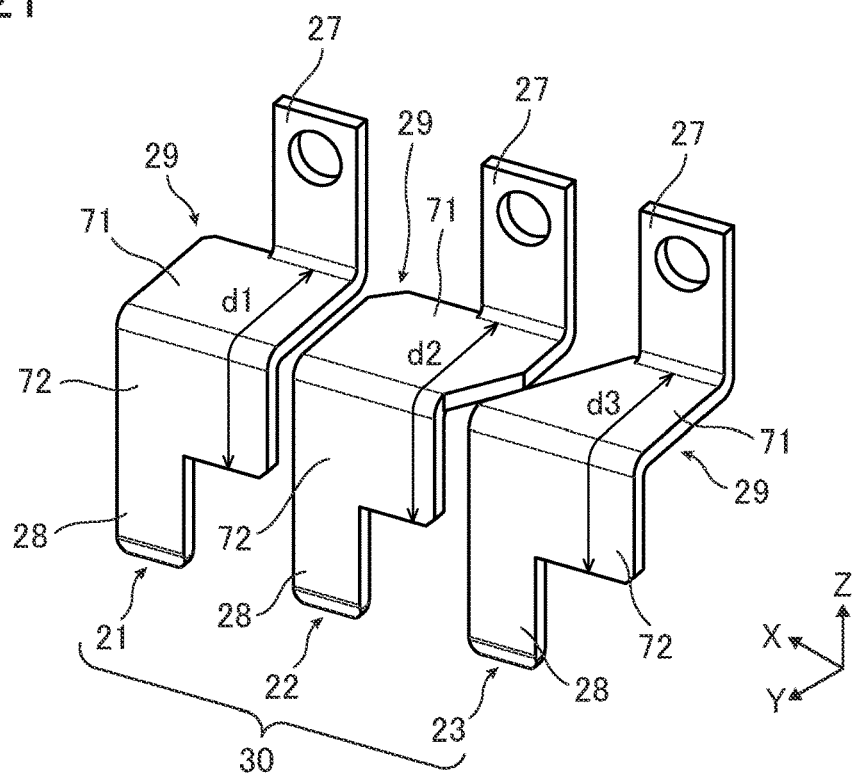
FIG. 21 is a perspective view showing the size of each portion of the first bus bar (part 2).
Figure 22:
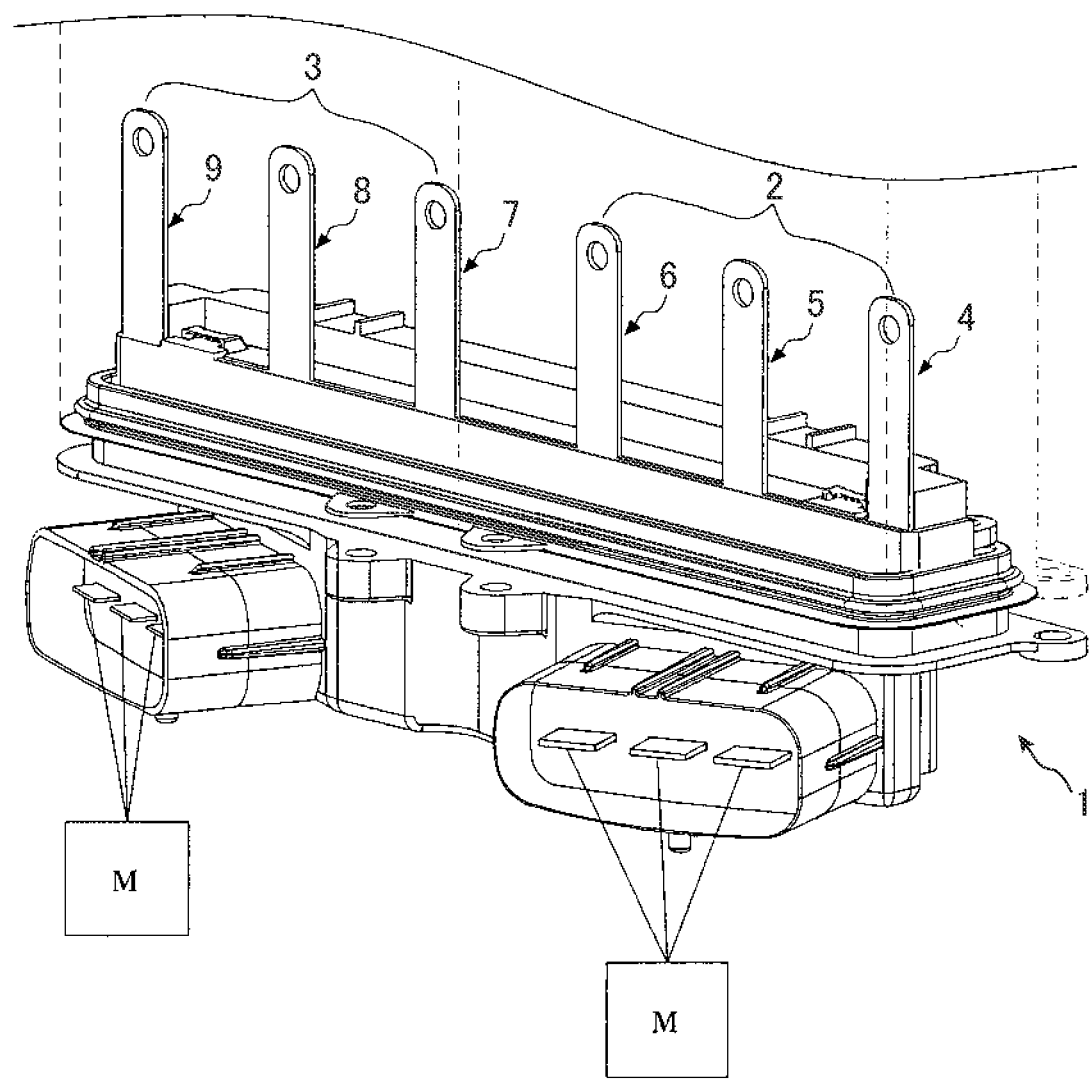
FIG. 22 is a view showing a conventional connector assembly.

As shown in FIGS. 20 and 21, the adjacent portion 71 extends, toward the +Y side, from one end of the joint portion 29 on a side adjacent to the first connection part 27. One end of the joint portion 29 on the side adjacent to the first connection part 27 (hereinafter, called "one end of the joint portion 29") is a portion which starts to be bent on the −Y side (specifically, a position whose curvature starts to change). As shown in FIGS. 20 and 21, the extending portion 72 is bent in the same direction as a direction in which the second connection part 28 extends in the Z direction, i.e., toward the −Z side, and extends to the other end of the joint portion 29 on a side adjacent to the second connection part 28. The other end of the joint portion 29 on the side adjacent to the second connection part 28 (hereinafter, called "the other end of the joint portion 29") is a portion contacting a base position of the second connection part 28, i.e., a position where a step between the joint portion 29 and the second connection part 28 is formed in the Z direction.

Figure 16:
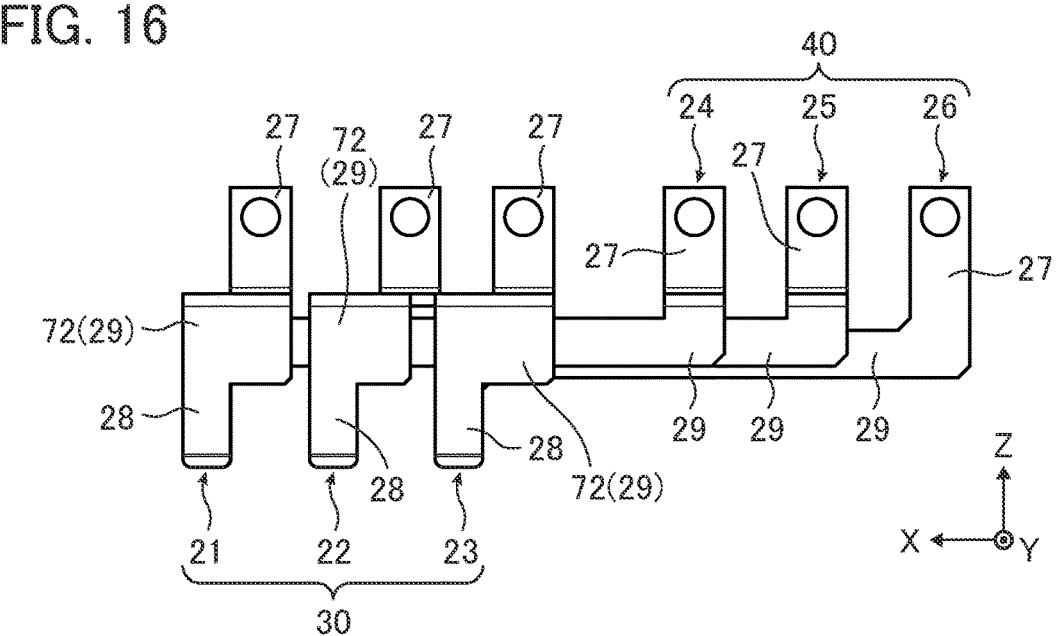
FIG. 16 is a view of the plurality of bus bars provided to the bus bar portion when viewed from the +Y side.
Figure 17:
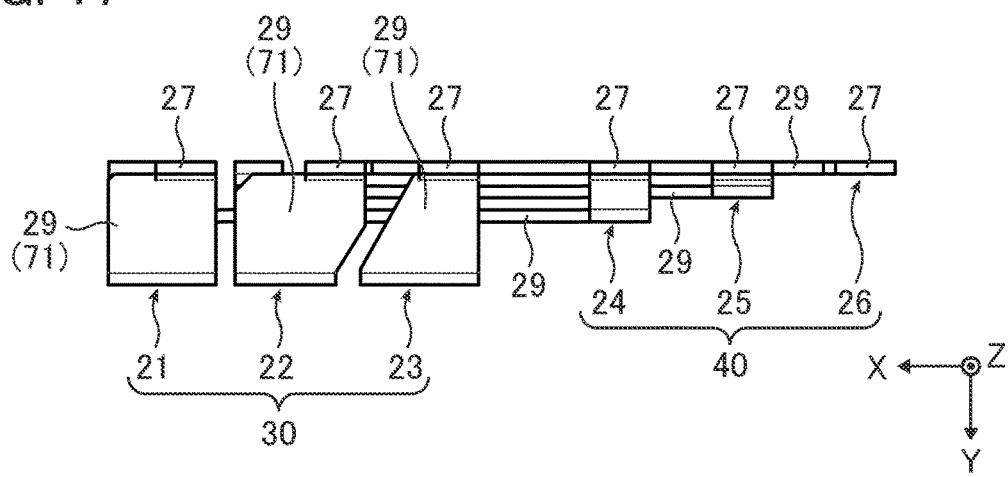
FIG. 17 is a view of the plurality of bus bars provided to the bus bar portion when viewed from the +Z side.
Figure 18:
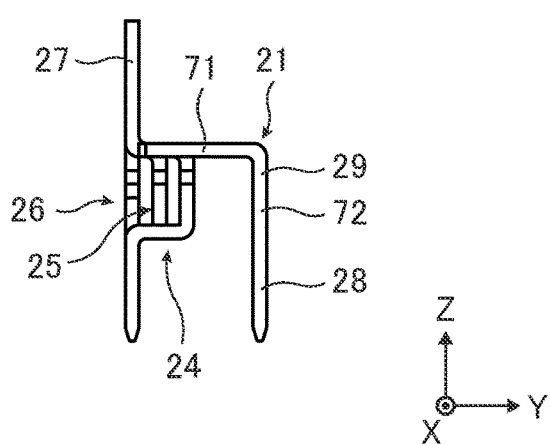
FIG. 18 is a view of the plurality of bus bars provided to the bus bar portion when viewed from the +X side.

On the other hand, as can be seen from FIG. 15, the joint portion 29 of each bus bar included in the second bus bar unit 40 has a shape extending long in the X direction. In the U-pole bus bar 24 and the V-pole bus bar 25 of the bus bars included in the second bus bar unit 40, each of a +X side end and a −X side end of the joint portion 29 is bent to have a L shape. Specifically, as shown in FIGS. 15 and 16, the −X side end of the joint portion 29 extends, toward the +Y side, from an end on a side adjacent to the first connection part 27 and is bent toward the −Z side. The +X side end of the joint portion 29 is bent toward the −Y side and the −Z side so as to be adjacent to the second connection part 28.

As shown in FIGS. 15 and 19, the joint portion 29 of each bus bar included in the second bus bar unit 40 extends remarkably longer in the X direction than the joint portion 29 of each bus bar included in the first bus bar unit 30. In other words, the joint portion 29 of each of the three bus bars 21, 22, 23 constituting the first bus bar unit 30 is shorter than the joint portion 29 of each of the three bus bars 24, 25, 26 constituting the second bus bar unit 40.

In the present invention, in each bus bar included in the first bus bar unit 30, a size of the joint portion 29 is set depending on a size of each of the first connection part 27 and the second connection part 28.

To be more specific, in each of the three bus bars 21, 22, 23 included in the first bus bar unit 30, the first connection part 27 and the second connection part 28 each have a thickness in the Y direction. The thickness is a thickness (plate thickness) of a portion of a metal plate constituting the bus bar, the portion corresponding to each of the first connection part 27 and the second connection part 28. In addition, in each of the three bus bars 21, 22, 23, the first connection part 27, the second connection part 28 and the joint portion 29 each have a width in the X direction. The width is a length from one X-directional end to the other X-directional end of each portion of the bus bar and corresponds to a lateral width of each portion of the bus bar.

As can be seen from FIGS. 20 and 21, in each of the three bus bars 21, 22, 23 included in the first bus bar unit 30, the width of the joint portion 29 is larger than the width of each of the first connection part 27 and the second connection part 28. In each of the bus bars 21, 22, 23 (i.e., the first bus bars), from one end to the other end of the joint portion 29, the width of the joint portion 29 is larger than that of each of the first connection part 27 and the second connection part 28. That is, in each first bus bar, the joint portion 29 has a width larger than that of each of the first connection part 27 and the second connection part 28 over the entire range from one end to the other end of the joint portion 29.

To be more specific, as shown in FIGS. 20 and 21, in each of the bus bars 21, 22, 23, the width of each of the adjacent portion 71 and the extending portion 72 constituting the joint portion 29 is larger than that of each of the first connection part 27 and the second connection part 28. Of the joint portion 29, the width of the extending portion 72 is equal to or smaller than that of the adjacent portion 71. In the case shown in FIGS. 20 and 21, in the joint portion 29 of each of the U-pole bus bar 21 and the W-pole bus bar 23, the width of the extending portion 72 is substantially the same as that of the adjacent portion 71, and in the joint portion 29 of the V-pole bus bar 22, the width of the extending portion 72 is slightly smaller than that of the adjacent portion 71.

As shown in FIGS. 20 and 21, of the three bus bars 21, 22, 23 arranged in the X direction, an end-to-end distance of the joint portion 29 included in the bus bar disposed between the two bus bars 21, 23 (i.e., V-pole bus bar 22) is larger than that of the joint portion 29 included in each of the two bus bars 21, 23. The end-to-end distance is a distance between opposite ends of the joint portion 29 in the X direction, and precisely, a distance from an end situated furthest on the +X side to an end situated furthest on the −X side of the joint portion 29, i.e., corresponds to the maximum width of the joint portion 29.

The shape of the joint portion 29 of each of the bus bars 21, 22, 23 can be arbitrarily determined as long as the width of the joint portion 29 satisfies the above-described condition. For example, for the purpose of disposing the three bus bars 21, 22, 23 more compactly, as shown in FIGS. 20 and 21, the adjacent portion 71 of the joint portion 29 included in one of two adjacent bus bars may be cut at its side facing the other bus bar, and the adjacent portion 71 of the joint portion 29 included in the other of the two adjacent bus bars may project so as to enter the above-described cut or have a shape corresponding to the cut.

Further, in each of the three bus bars 21, 22, 23 included in the first bus bar unit 30, as shown in FIGS. 20 and 21, the extending length of the joint portion 29 is larger than the width of each of the first connection part 27 and the second connection part 28. The extending length of the joint portion 29 is a distance from one end to the other end of the joint portion 29, and more specifically, a distance from one end to the other end of the joint portion 29 in the hypothetical case where the bent extending portion 27 is unbent corresponds to the extending length of the joint portion 29 and is designated by d1, d2, d3 in FIGS. 20 and 21.

<<Effectiveness of Connector Assembly According to Invention>>

As described above, in the present invention, in each of the three bus bars 21, 22, 23 included in the first bus bar unit 30, the width of the joint portion 29 is larger than that of each of the first connection part 27 and the second connection part 28, and the extending length of the joint portion 29 is larger than the width of each of the first connection part 27 and the second connection part 28. With this configuration, temperature rise in the connector assembly 10 during energization can be effectively suppressed.

To be more specific, in the configuration in which the bus bar portion 12 is assembled with the connector portion 14 to form the connector assembly as in the present invention, an amount of heat generated in the bus bar during energization tends to become larger because, for example, contact resistance becomes larger than that of a configuration in which a terminal of each of the motor and the inverter is directly connected to the bus bar. In particular, in the first bus bar unit 30, the length of the joint portion 29 of each bus bar is smaller as compared with the second bus bar unit 40, so that temperature rise in each bus bar may become more remarkable.

From the above circumstances, in the present invention, in each bus bar in the first bus bar unit 30, the width of the joint portion 29 is larger than that of each of the first connection part 27 and the second connection part 28 over the entire range from one end to the other end of the joint portion 29. In each of the above-described bus bars, the extending length of the joint portion 29 is larger than the width of each of the first connection part 27 and the second connection part 28. By increasing the surface area of the joint portion 29 in this manner, an amount of heat dissipated from the joint portion 29 can be increased, whereby temperature rise in each bus bar in the first bus bar unit 30 can be effectively suppressed.

Of the bus bar, the first connection part 27 and the second connection part 28 are designed depending on a specification of a power source or a specification of a device connected to the bus bar, while the freedom of design of the joint portion 29 situated between the connection parts is relatively high. Therefore, for the purpose of improving heat dissipation in the joint portion 29, the shape of the joint portion 29, including the width, the extending length and the like, can be optimized, whereby temperature rise in the bus bar can be suppressed more effectively.

Suppression of temperature rise in the bus bar can minimize an influence of the temperature rise in the connector assembly 10 and for example, can reduce thermal stress to the periphery of the bus bar. Restrictions on selection of materials of the constituent components of the connector assembly 10 due to temperature rise in the bus bar are relaxed. For example, the material of the packing 55 or the like to be mounted on the main terminal 17 inside the connector portion 14 does not need to be limited to a material having high heat resistance or the like, whereby types of candidate materials for use increase.

Other Embodiments

While the connector assembly of the invention has been described above with reference to a specific example, the foregoing embodiment is mere an example used to facilitate the understanding of the invention, and there may be other embodiments.

In the foregoing embodiment, the plurality of first bus bars and the plurality of second bus bars are provided and the first bus bar and the second bus bar are different in length of the joint portion 29, but the invention is not limited thereto. For example, only one first bus bar and one second bus bar may be provided. Meanwhile, in the configuration in which a plurality of first bus bars are provided as in the foregoing embodiment, when the plurality of first bus bars are densely disposed for example, heat is easily accumulated and temperature rise easily occurs in the first bus bar disposed on the inner side. Therefore, by increasing the surface area of the joint portion 29 to increase an amount of heat dissipated from the joint portion 29, the effect of the invention of suppressing temperature rise can be exhibited more remarkably.

In the foregoing embodiment, three or more first bus bars are arranged in a line, specifically, three bus bars are arranged in the X direction in the first bus bar unit 30. In the foregoing embodiment, the end-to-end distance of the joint portion 29 of each of the three or more bus bars included in the first bus bar unit 30 is different between the bus bars. Specifically, the end-to-end distance of the joint portion 29 in the bus bar disposed between two bus bars is larger than that of the joint portion 29 of each of the two bus bars. However, the invention is not limited thereto, and for example, the end-to-end distance of the joint portion 29 of each bus bar may be the same between the bus bars. Meanwhile, as described above, of the three or more first bus bars, in the first bus bar disposed on the inner side, heat is easily accumulated, whereby temperature rise easily occurs. Therefore, it is preferable that heat dissipation of a first bus bar disposed between two first bus bars is more improved, and from this aspect, it is preferable that the end-to-end distance of the joint portion 29 of the first bus bar disposed between the two first bus bars is set to be larger.

In the foregoing embodiment, in all the first bus bars included in the first bus bar unit 30, from one end to the other end of the joint portion 29, the width of the joint portion 29 is larger than that of each of the connection parts 27, 28, and the extending length of the joint portion 29 is larger than the width of each of the connection parts 27, 28. However, the invention is not limited thereto, and only in one or some of the plurality of first bus bars included in the first bus bar unit 30, the width of the joint portion 29 may be larger than that of each of the connection parts 27, 28, and the extending length of the joint portion 29 may be larger than the width of each of the connection parts 27, 28.

In the foregoing embodiment, a connector assembly mounted on a hybrid vehicle was described as an example of the connector assembly. However, the connector assembly is not limited to the forgoing example, and it suffices if the connector assembly is used for electrically connecting a plurality of devices, and the present invention can be applied to a connector assembly used in that case.

What is claimed is:

1. A connector assembly comprising:
a connector portion having an insertion port; and
a bus bar portion having a bus bar,
wherein the bus bar includes
a first connection part extending in a first direction,
a second connection part extending in an opposite direction from the first connection part along the first direction, the second connection part being inserted in the insertion port, and
a joint portion joining the first connection part and the second connection part,
wherein each of the first connection part and the second connection part has a thickness in a second direction intersecting the first direction,
wherein each of the first connection part, the second connection part and the joint portion has a width in a third direction intersecting the first direction and the second direction,
wherein the width of the joint portion is larger than that of each of the first connection part and the second connection part in a range from one end of the joint portion on a side adjacent to the first connection part to another end of the joint portion on a side adjacent to the second connection part,
wherein a distance from the one end to the another end of the joint portion is larger than the width of each of the first connection part and the second connection part
wherein the bus bar includes a first bus bar and a second bus bar,
wherein each of the first bus bar and the second bus bar has the first connection part, the second connection part and the joint portion,
wherein the joint portion of the second bus bar extends longer in the third direction than the joint portion of the first bus bar,
wherein in the first bus bar, the width of the joint portion is larger than that of each of the first connection part and the second connection part in a range from the one end to the another end of the joint portion, and the distance from the one end to the another end of the joint portion is larger than the width of each of the first connection part and the second connection part
wherein the joint portion of the first bus bar includes: an adjacent portion which is adjacent to and intersects the first connection part; and an extending portion which is bent from the adjacent portion and extends toward a side on which the second connection part is situated,
wherein in the first bus bar, a width of each of the adjacent portion and the extending portion is larger than that of each of the first connection part and the second connection part,
wherein the width of the extending portion is equal to or smaller than that of the adjacent portion
wherein the bus bar portion is assembled with the connector portion in the first direction,
wherein the adjacent portion extends from the one end of the joint portion in the second direction, and
wherein the extending portion is bent in a direction same as a direction in which the second connection part extends in the first direction, and extends to the another end of the joint portion.

2. The connector assembly according to claim 1, wherein the second connection part of the first bus bar and the second connection part of the second bus bar are separately and electrically connected to devices different from each other.

3. The connector assembly according to claim 1, wherein a distance from the one end to the another end of the joint portion of the first bus bar is a distance from the one end to the another end of the joint portion of the first bus bar in a case where the extending portion having been bent is unbent.

4. The connector assembly according to claim 1, wherein the first connection part of the first bus bar and the second connection part of the first bus bar are separately situated at positions different from each other in the third direction.

5. The connector assembly according to claim 1,
wherein the first bus bar includes a plurality of first bus bars arranged in the third direction,
wherein the second bus bar includes a plurality of second bus bars arranged in the third direction,
wherein the joint portion of each of the plurality of second bus bars extends longer in the third direction than the joint portion of each of the plurality of first bus bars, and
wherein in each of the plurality of first bus bars, a width of the joint portion is larger than that of each of the first connection part and the second connection part in a range from the one end to the another end of the joint portion, and a distance from the one end to the another end of the joint portion is larger than a width of each of the first connection part and the second connection part.

6. The connector assembly according to claim 5, wherein the plurality of first bus bars are three or more first bus bars arranged in the third direction, and
wherein in a first bus bar disposed between two first bus bars of the three or more first bus bars, a distance between opposite ends of the joint portion in the third direction is larger than that of each of the two first bus bars.

7. The connector assembly according to claim 5, wherein the bus bar portion has a holder holding the plurality of first bus bars and the plurality of second bus bars, and
wherein a whole of the joint portion included in each of the plurality of first bus bars and a whole of the joint portion included in each of the plurality of second bus bars are embedded in an insulating resin material constituting the holder.

8. The connector assembly according to claim 1, wherein the connector portion has a terminal electrically connected to the second connection part, a terminal holding portion having a cavity portion through which part of the terminal passes, and a packing disposed around the terminal in the cavity portion.

9. The connector assembly according to claim 2,
wherein the first bus bar includes a plurality of first bus bars arranged in the third direction,
wherein the second bus bar includes a plurality of second bus bars arranged in the third direction,
wherein the joint portion of each of the plurality of second bus bars extends longer in the third direction than the joint portion of each of the plurality of first bus bars, and
wherein in each of the plurality of first bus bars, a width of the joint portion is larger than that of each of the first connection part and the second connection part in a range from the one end to the another end of the joint portion, and a distance from the one end to the another end of the joint portion is larger than a width of each of the first connection part and the second connection part.

10. The connector assembly according to claim 3,
wherein the first bus bar includes a plurality of first bus bars arranged in the third direction,
wherein the second bus bar includes a plurality of second bus bars arranged in the third direction,
wherein the joint portion of each of the plurality of second bus bars extends longer in the third direction than the joint portion of each of the plurality of first bus bars, and
wherein in each of the plurality of first bus bars, a width of the joint portion is larger than that of each of the first connection part and the second connection part in a range from the one end to the another end of the joint portion, and a distance from the one end to the another end of the joint portion is larger than a width of each of the first connection part and the second connection part.

11. The connector assembly according to claim 4,
wherein the first bus bar includes a plurality of first bus bars arranged in the third direction,
wherein the second bus bar includes a plurality of second bus bars arranged in the third direction,
wherein the joint portion of each of the plurality of second bus bars extends longer in the third direction than the joint portion of each of the plurality of first bus bars, and
wherein in each of the plurality of first bus bars, a width of the joint portion is larger than that of each of the first connection part and the second connection part in a range from the one end to the another end of the joint portion, and a distance from the one end to the another end of the joint portion is larger than a width of each of the first connection part and the second connection part.

12. A connector assembly comprising:
a connector portion having an insertion port; and
a bus bar portion having a bus bar,
wherein the bus bar includes
a first connection part extending in a first direction,
a second connection part extending in an opposite direction from the first connection part along the first direction, the second connection part being inserted in the insertion port, and
a joint portion joining the first connection part and the second connection part,
wherein each of the first connection part and the second connection part has a thickness in a second direction intersecting the first direction,
wherein each of the first connection part, the second connection part and the joint portion has a width in a third direction intersecting the first direction and the second direction,
wherein the width of the joint portion is larger than that of each of the first connection part and the second connection part in a range from one end of the joint portion on a side adjacent to the first connection part to another end of the joint portion on a side adjacent to the second connection part,
wherein a distance from the one end to the another end of the joint portion is larger than the width of each of the first connection part and the second connection part,
wherein the bus bar includes a first bus bar and a second bus bar,
wherein each of the first bus bar and the second bus bar has the first connection part, the second connection part and the joint portion,
wherein the joint portion of the second bus bar extends longer in the third direction than the joint portion of the first bus bar,
wherein in the first bus bar, the width of the joint portion is larger than that of each of the first connection part and the second connection part in a range from the one end to the another end of the joint portion, and the distance from the one end to the another end of the joint portion is larger than the width of each of the first connection part and the second connection part,
wherein the first bus bar includes a plurality of first bus bars arranged in the third direction,
wherein the second bus bar includes a plurality of second bus bars arranged in the third direction, wherein the joint portion of each of the plurality of second bus bars extends longer in the third direction than the joint portion of each of the plurality of first bus bars, wherein in each of the plurality of first bus bars, a width of the joint portion is larger than that of each of the first connection part and the second connection part in a range from the one end to the another end of the joint portion, and a distance from the one end to the another end of the joint portion is larger than a width of each of the first connection part and the second connection part, wherein the plurality of first bus bars are three or more first bus bars arranged in the third direction, and wherein in a first bus bar disposed between two first bus bars of the three or more first bus bars, a distance between opposite ends of the joint portion in the third direction is larger than that of each of the two first bus bars.

13. A connector assembly comprising:

a connector portion having an insertion port; and a bus bar portion having a bus bar, wherein the bus bar includes a first connection part extending in a first direction, a second connection part extending in an opposite direction from the first connection part along the first direction, the second connection part being inserted in the insertion port, and a joint portion joining the first connection part and the second connection part, wherein each of the first connection part and the second connection part has a thickness in a second direction intersecting the first direction, wherein each of the first connection part, the second connection part and the joint portion has a width in a third direction intersecting the first direction and the second direction, wherein the width of the joint portion is larger than that of each of the first connection part and the second connection part in a range from one end of the joint portion on a side adjacent to the first connection part to another end of the joint portion on a side adjacent to the second connection part, wherein a distance from the one end to the another end of the joint portion is larger than the width of each of the first connection part and the second connection part, wherein the bus bar includes a first bus bar and a second bus bar, wherein each of the first bus bar and the second bus bar has the first connection part, the second connection part and the joint portion, wherein the joint portion of the second bus bar extends longer in the third direction than the joint portion of the first bus bar, wherein in the first bus bar, the width of the joint portion is larger than that of each of the first connection part and the second connection part in a range from the one end to the another end of the joint portion, and the distance from the one end to the another end of the joint portion is larger than the width of each of the first connection part and the second connection part, wherein the joint portion of the first bus bar includes: an adjacent portion which is adjacent to and intersects the first connection part; and an extending portion which is bent from the adjacent portion and extends toward a side on which the second connection part is situated, wherein in the first bus bar, a width of each of the adjacent portion and the extending portion is larger than that of each of the first connection part and the second connection part, wherein the width of the extending portion is equal to or smaller than that of the adjacent portion, wherein the first bus bar includes a plurality of first bus bars arranged in the third direction, wherein the second bus bar includes a plurality of second bus bars arranged in the third direction, wherein the joint portion of each of the plurality of second bus bars extends longer in the third direction than the joint portion of each of the plurality of first bus bars, and wherein in each of the plurality of first bus bars, a width of the joint portion is larger than that of each of the first connection part and the second connection part in a range from the one end to the another end of the joint portion, and a distance from the one end to the another end of the joint portion is larger than a width of each of the first connection part and the second connection part.

* * * * *